US007213019B1

(12) United States Patent
Angulo Noris et al.

(10) Patent No.: US 7,213,019 B1
(45) Date of Patent: May 1, 2007

(54) CAREER MANAGEMENT TOOLS AND NETWORK

(75) Inventors: Roberto Angulo Noris, Stanford, CA (US); Ana Maria Bertran Ortiz, Stanford, CA (US)

(73) Assignee: After College, Inc., San Francisco, CA (US)

( * ) Notice: Subject to any disclaimer, the term of this patent is extended or adjusted under 35 U.S.C. 154(b) by 63 days.

(21) Appl. No.: 10/145,597

(22) Filed: May 14, 2002

Related U.S. Application Data

(60) Provisional application No. 60/291,208, filed on May 15, 2001.

(51) Int. Cl.
*G06F 17/30* (2006.01)

(52) U.S. Cl. ......................... 707/10; 707/200; 707/101

(58) Field of Classification Search ............. 707/1–10, 707/100–104.1, 200–205; 709/223; 705/8–11
See application file for complete search history.

(56) References Cited

U.S. PATENT DOCUMENTS 6,385,620 B1 * 5/2002 Kurzius et al. .......... 707/104.1
6,490,617 B1 * 12/2002 Hemphill et al. ........... 709/223
2001/0016846 A1 * 8/2001 Chakrabarti et al. ........ 707/102
2002/0046074 A1 * 4/2002 Barton ......................... 705/8
2004/0107192 A1 * 6/2004 Joao ............................ 707/3
2006/0036647 A1 * 2/2006 Fichtner et al. .......... 707/104.1

OTHER PUBLICATIONS

Inventors' Declaration Describing Related Activities Occuring Prior to the Priority Date of May 15, 2001 for U.S. Appl. No. 10/145,597.

* cited by examiner

*Primary Examiner*—Mohammad Ali
(74) *Attorney, Agent, or Firm*—Dickstein Shapiro LLP

(57) ABSTRACT

Group-Specific "Career Management Tools" allow groups (a sample of which include: academic departments at colleges and universities, academic groups, campus fraternity chapters, professional group chapters, and any cluster of individuals that identifies itself as a group), to manage their career-related activity on-line, through a tool containing functionality that includes, but is not limited to: a group-specific resume database, a group-specific job database, and a group-specific alumni database. Career Management Tools provide career-related information for group members, and such information is targeted specifically to the group. Information is entered into the Career Management Tool by group members (such as students, faculty, department administrators, group officers, and alumni), or by entities trying to target group members. Career Management Tools are deployed on a group's web site, and are branded to the group site's look and feel and they are accessible from the group's web site.

25 Claims, 25 Drawing Sheets

Instructions for outputting the database to a spreadsheet.

CAREER MANAGEMENT TOOLS AND NETWORK

CROSS REFERENCE TO RELATED APPLICATIONS

The present application is related to provisional patent application No. 60/291,208, filed May 15, 2001 entitled "Career Management Network and Tools", and the benefit of the earlier May 15, 2001 filing date is claimed in accordance with 35 USC 119 (e) (1).

BACKGROUND OF THE INVENTION

AfterCollege, Inc. has created a unique Internet recruiting service that greatly facilitates employers' efforts to recruit university graduates and students. It does this by establishing highly targeted recruiting relationships with individual academic departments, as well as academic groups, and professional group chapters, allowing AfterCollege to gather information about, and providing access to, graduating college students who are entering the job market. AfterCollege is using these unique relationships to provide a set of recruiting services to employers that cannot easily be matched by other recruiting services.

In interviews with employers, AfterCollege discovered that the number one need of companies in recruiting entry-level talent is the ability to specifically target the right candidates. Since efficient recruiting is becoming increasingly vital in a time-compressed work environment, employers want to streamline their efforts by targeting only the most qualified individuals. Currently, employers utilize a variety of techniques to recruit college candidates. These include advertising in school newspapers, posting jobs at university career centers, listing jobs on Internet sites, participating in industry career fairs, hosting their own events at targeted schools and establishing special "corporate affiliate" ties with individual academic departments.

Many of these recruiting strategies are not effective in reaching the most qualified candidates. As a consequence, employers are bombarded with resumes, only a few of which match the jobs. Those techniques that are more targeted tend to be expensive. Large companies spend hundreds of thousands of dollars visiting campuses nationwide with the hope of attracting highly sought candidates. Often, these on-campus events suffer from low student attendance and/or attendance by unqualified candidates.

Approximately 5 million entry-level graduates and recent graduates pursue a new job each year. Online career services, however, currently contain approximately 750,000 resumes of entry-level job seekers combined (many of them duplicate among different sites), a market penetration of approximately 15%. Furthermore, university career centers, which are dedicated to helping students find employment, only account for 16% of students finding jobs.

SUMMARY OF THE INVENTION

AfterCollege works directly with college and university academic departments and student groups, and with professional group chapters, to establish branded Career Management Tools within their web sites. These Career Management Tools, hosted by AfterCollege, serve as self-contained hubs of activity where employers, alumni, and faculty can post information (examples include: jobs, research and teaching opportunities, and class projects), and group and department members can connect with employers and alumni at the department or group level.

The Career Management Tools also give AfterCollege an unmatched ability to target employment and academic information to members of a specific academic department or student group within a university.

Through a Career Management Tool, group members can access group-specific job opportunities and a database of alumni contacts; employers are able to narrowly hone their recruiting efforts by discipline and academic curriculum, and group administrators are able to fulfill a need for their students, alumni, and employers through a tool that is maintenance-free and easy to implement.

The Career Management Tool allows a group to easily manage job postings and member resumes directly from the group's website. The purpose of the Career Management Tool is to create a group-specific network that provides a reliable long-term network for students, alumni, faculty, and employers. The Career Management Tool is provided to academic departments and groups, for the benefit of their members, as a complimentary service to their university's existing career placement services.

A large benefit of the Career Management Tool is its ability to create a group-specific community that provides a reliable long-term network for members, alumni, and faculty of a group, and employers.

The Career Management Tool is designed to improve the efficiency of group members' job seeking efforts. It facilitates this by creating employment networks for academic and professional group websites where:

1. Members can confidentially post their resumes and have access to relevant group-specific employment and research opportunities.

2. Alumni, employers, faculty, and other interested parties can post employment and research opportunities and access member resumes. This targeted approach allows members to get better, more relevant information, faster that through any other source.

3. Alumni can register to become contacts for group members and they can stay informed about group-specific news and events, and connect with members looking for employment and research opportunities.

The Career Management Tool, which consists of customized web pages that adapt to the academic department/student group site's look and feel, improves upon the existing bulletin boards and job books found at most department offices. Periodically, AfterCollege will post relevant employment and academic research content to the group's Career Management Tool from its network of employers. This service allows a group's members to enjoy greater exposure to an expanded pool of employers who provide group-specific content. Additionally, the Career Management Tool includes an alumni database that can be use to keep track of members who have graduated.

AfterCollege works with academic departments, student groups, and professional group chapters to establish relationships between their members and employers who specifically seek students with their identified skill sets. By taking this approach, AfterCollege is able to better match group and department members with more relevant employment and research opportunities. At the same time, it is able to reach a larger population of college job seekers, since students interact more with their academic department and student groups, than with almost any other entity within the college or university.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention (in the drawings, the reference to the "Job Resource web site" is a part of "AfterCollege").

FIELD OF THE INVENTION

Figure 1:
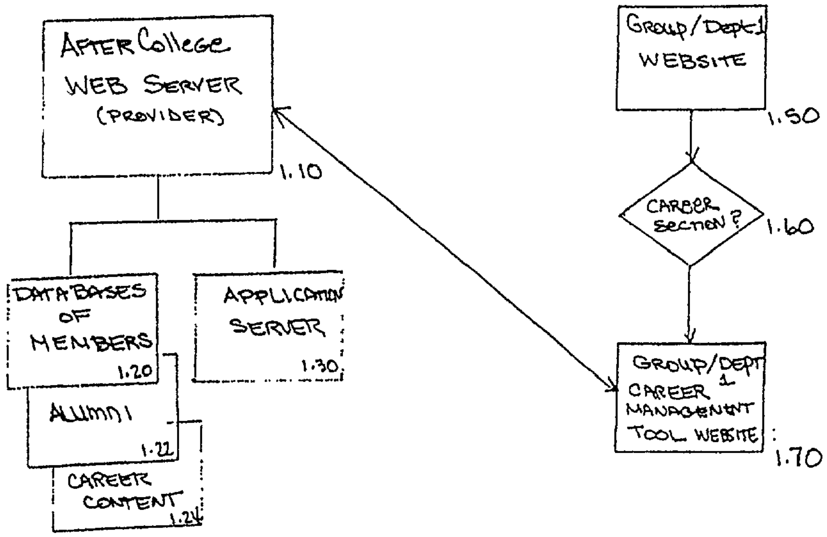
FIG. 1 shows a block diagram of a career management tool of the present invention.

The invention pertains to targeting individuals who identify themselves as part of a group, through that group, for the purpose of employment recruiting. In particular, it relates to academic departments and groups within a college or university, and to affinity groups composed of professionals who have some interest or academic background in common.

DETAILED DESCRIPTION OF THE PREFERRED EMBODIMENTS

A Career Management Tool has a similar look and feel to the web site of the group or department that implements it. It is accessible to group members through a designated career or employment section, or through the home page of the group web site, and offers employer, alumni, faculty, and member services.

A Career Management Tool can be implemented as a hypertext link on a web site, or as a box module. The box module contains links that access specific services that are part of the Career Management Tool.

Group members, alumni, and employers visiting the group web site will access the group Career Management Tool, which will contain various functions. The Career Management Tool front-end can be hosted on the group web site. The back-end application, along with the database of members, alumni, and employment and research content will reside on the provider's (AfterCollege, Inc.) web server(s). Group members, alumni, and employers can take advantage of functionality and seamless integration of services provided through the group's Career Management Tool, which has a similar look and feel to the group's web site.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

A "group" in the context of this invention, refers to a cluster of individuals who share some common interest or academic background. Some of these groups include, but are not limited to: academic departments at colleges and universities, academic student groups, honor societies, campus fraternity chapters, professional group chapters, ethnicity-focused groups of professionals and college students.

The term "Career Management Tool" refers to the invention in question, and is defined as a set of services that are bundled together in an application that allows "groups" to manage their career-related activity. These services may also relate to academic activity, which is indirectly related to employment recruiting, involving employers, faculty, and members of the "group".

The term "Career Management Tool Network", or "Network" for short, refers to all "Career Management Tools", or a sub-set of Career Management Tools in use throughout the Internet or any other network.

The term "provider" refers to the company/organization that provides, implements, and/or hosts these tools, commonly known as an "application service provider", in this case, the assignee of this patent: AfterCollege, Inc.

FIG. 1 illustrates that two web sites 1.10, 1.50 are utilized in providing the Career Management Tools' (CMT) services to one specific group/department (group/dept). The Career Management Tool is deployed on to the group's web site 1.50 and is tailored to the site's look and feel. The users will access the CMT from the group's web site 1.50. In one implementation, the user will select to go to the 'career section' 1.60 which will link to the group/dept CMT web site 1.70. The databases 1.20, 1.22, 1.24 that store the information for a group's CMT are hosted on the provider's web server(s), along with the databases for other groups'CMT (see FIG. 25). All these databases are located at and are also accessible through a central location, the Web Server 1.10, which is maintained and supported by the provider (commonly known as the 'application service provider', in this case, AfterCollege, Inc.). All Career Management Tools combined create a Career Management Tool Network (see FIG. 25).

Figure 2:
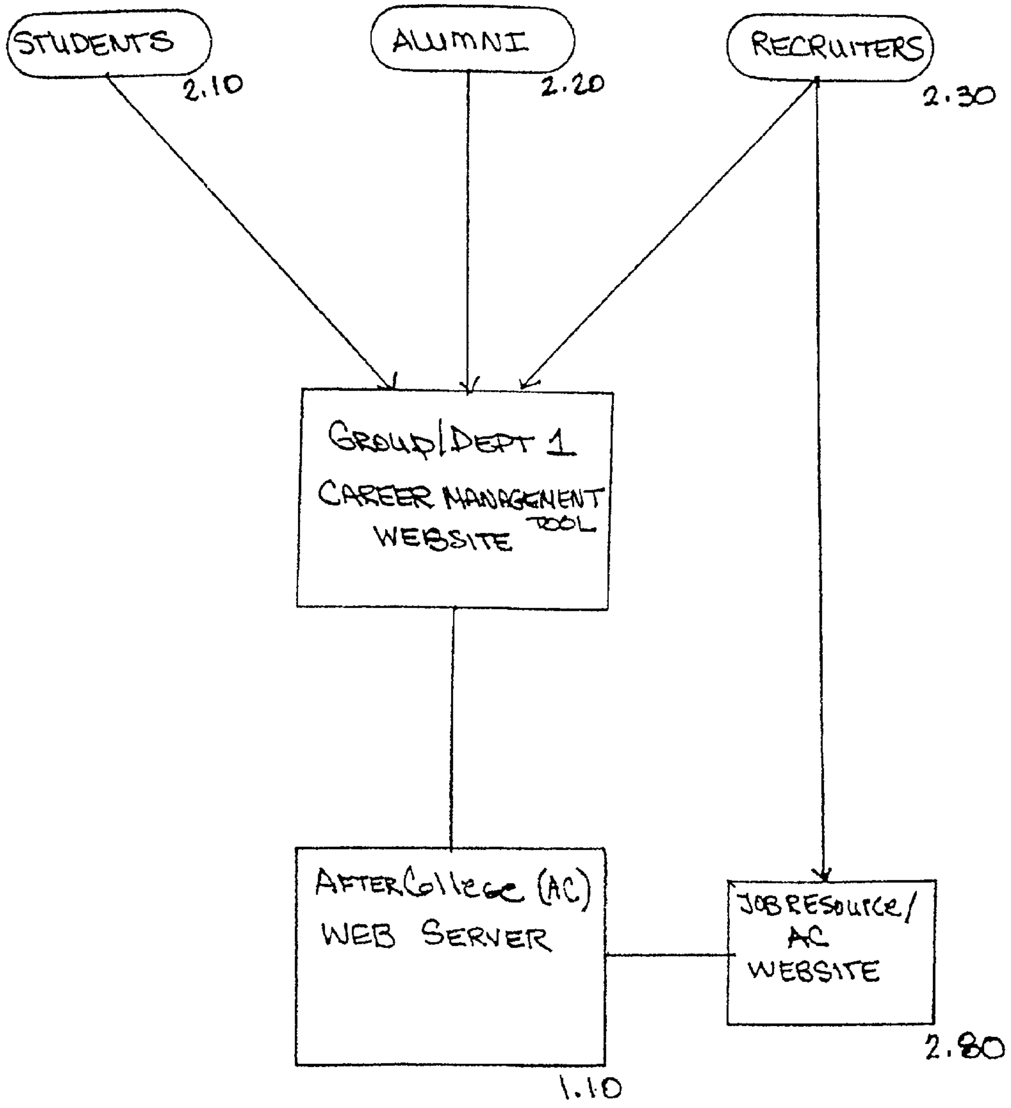
FIG. 2 shows a block diagram of a career management tool website of the present invention.

FIG. 2 is an overview showing that different users such as, students 2.10, alumni 2.20, and recruiters 2.30, can use the group/dept CMT to enter, update, view, or search through data. Employers and recruiters also have the ability to enter information into a particular CMT 2.50 via the AfterCollege (provider) Web Site 2.80.

Figure 3:
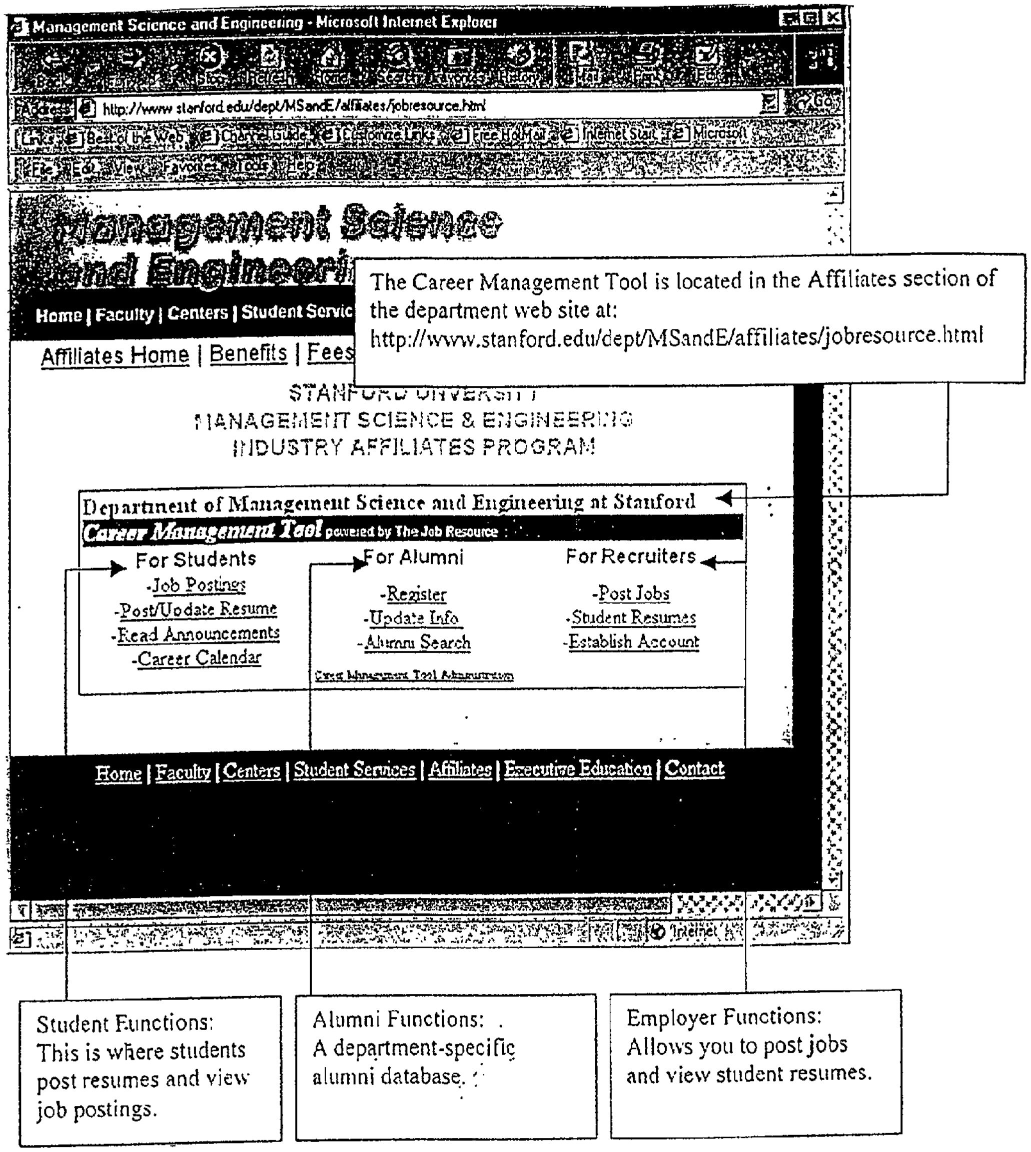
FIG. 3 shows a website display of the present invention.

FIG. 3 is a sample screen shot of a Career Management Tool implemented by a department. This is what users will view when first entering the group/dept CMT. The screen displays various services available to users through the CMT.

Figure 4:
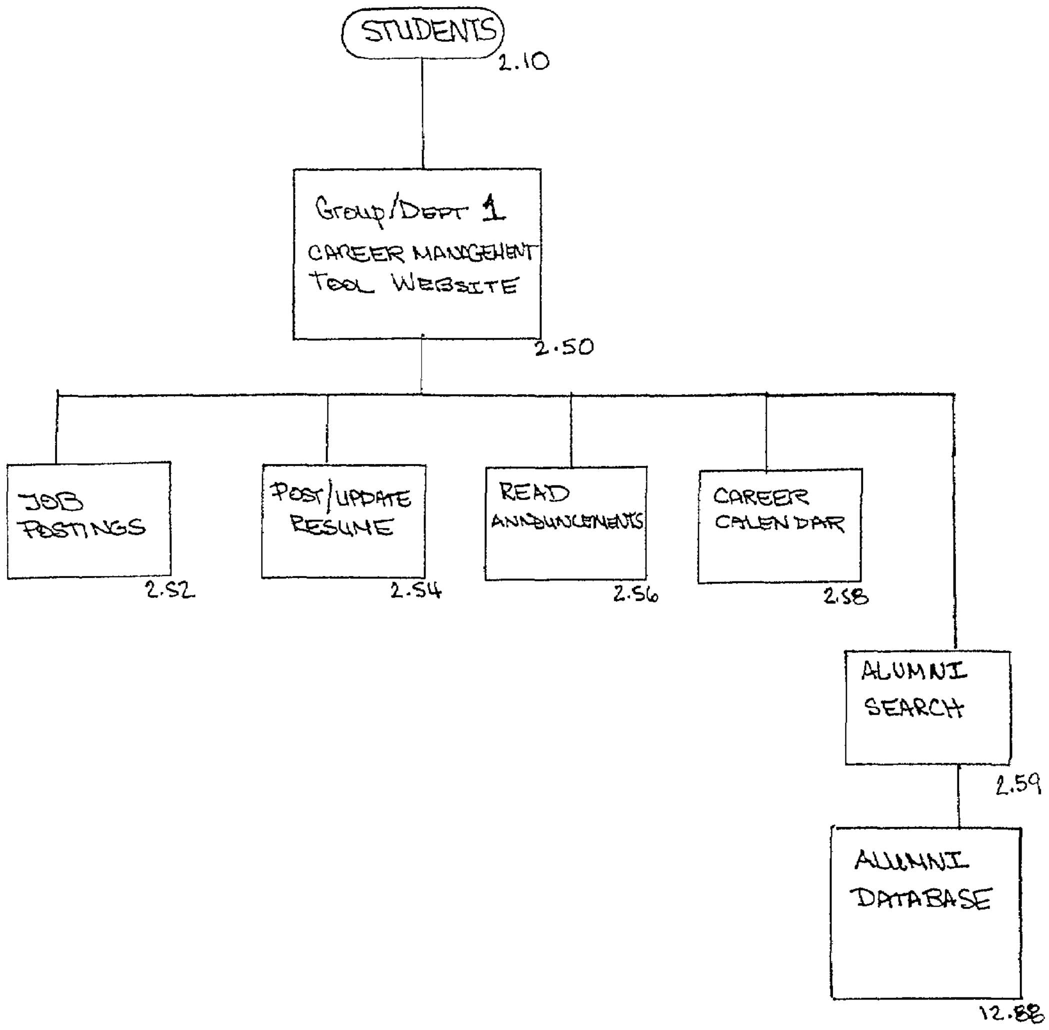
FIG. 4 shows a block diagram of how students can use the career management tool of the present invention.

FIG. 4 shows the various paths a student 2.10 may choose while in the group/dept CMT 2.50. A student may view job postings 2.52, sign up, post or update his/her resume, read announcements 2.56, view the career calendar 2.58, or access the alumni database 2.60 through an alumni search 2.59.

Figure 5:
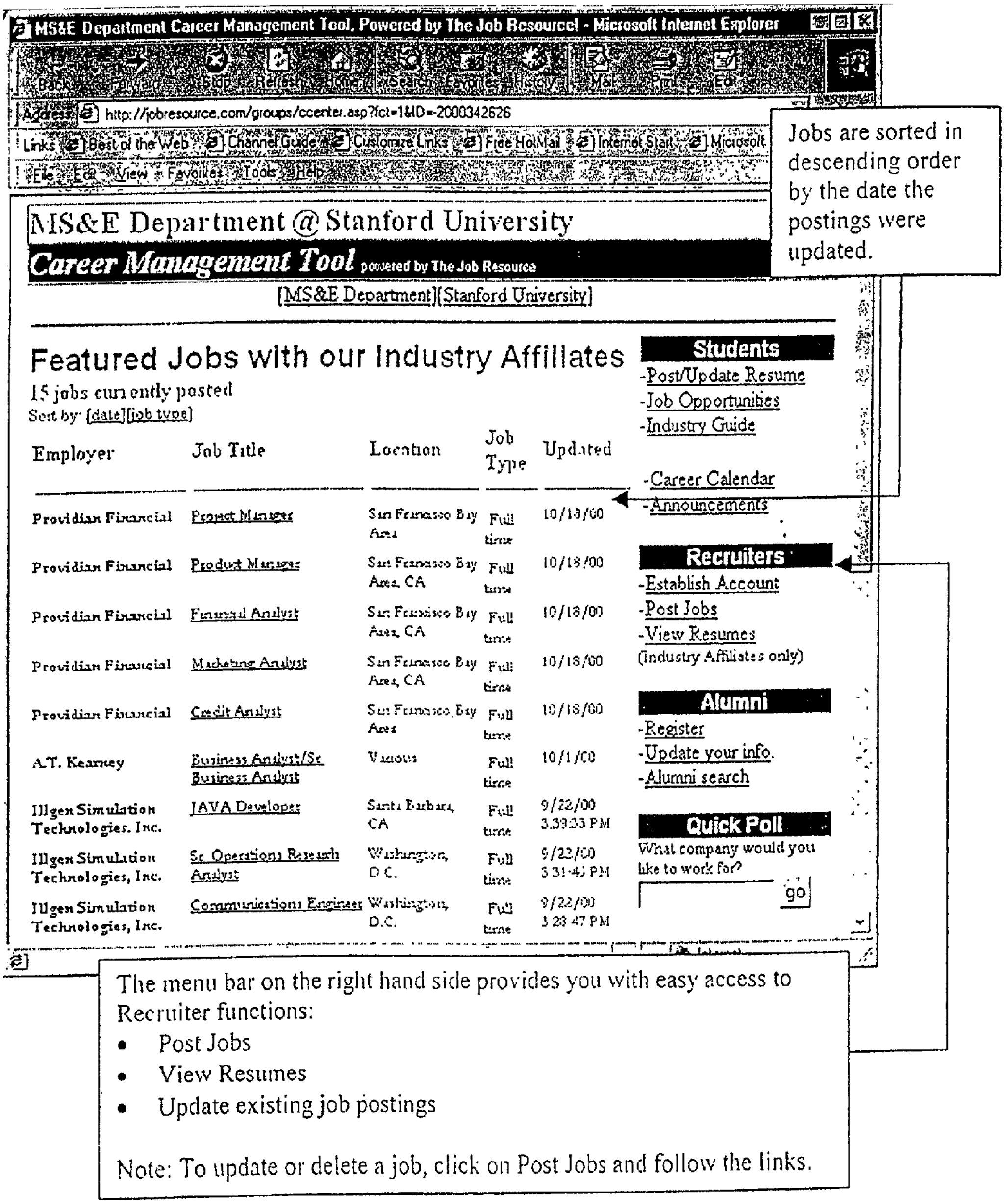
FIG. 5 shows another website display of the present invention.

FIG. 5 is an example of a screen that the student will see when choosing to view job opportunities/postings. Besides visiting this page, the student also receives periodic emails alerting that new opportunities have been posted.

Figure 6:
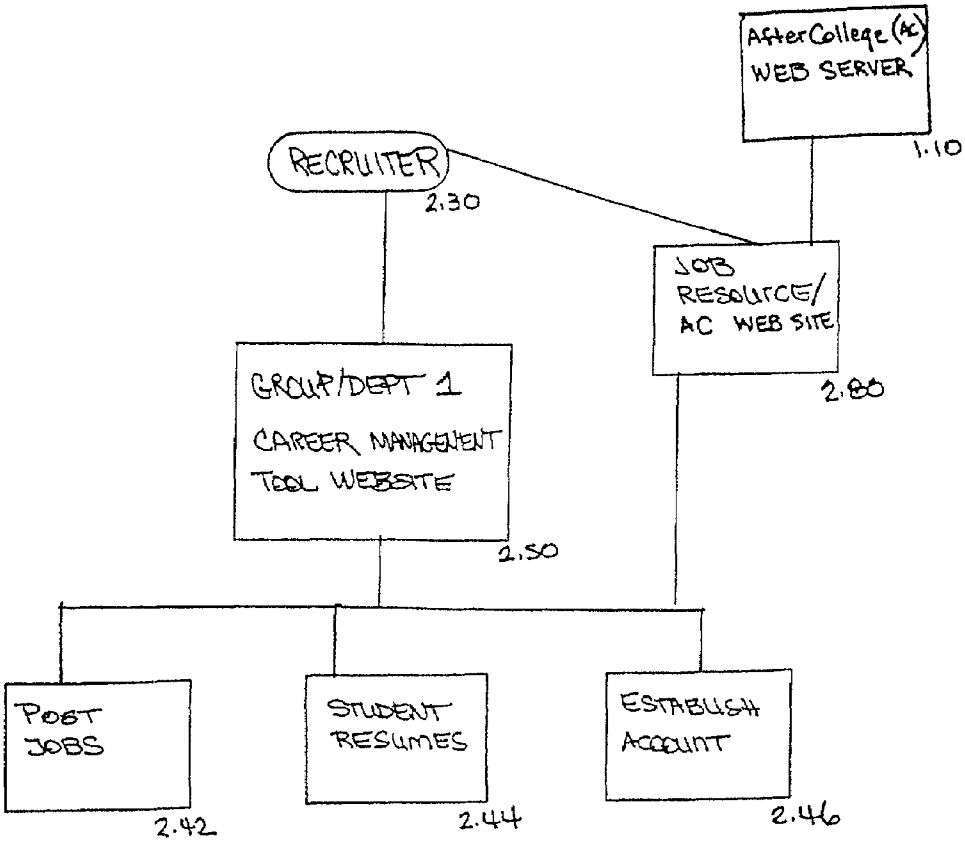
FIG. 6 shows a block diagram of how recruiters can use the career management tool of the present invention.

FIG. 6 shows the various paths an employer or recruiter 2.30 may choose while entering through the group/dept CMT 2.50 or through the AfterCollege web site 2.80. A recruiter may establish an account 2.46, view resumes 2.44, or post new job opportunities/postings 2.42 (existing jobs may also be updated).

Figure 7:
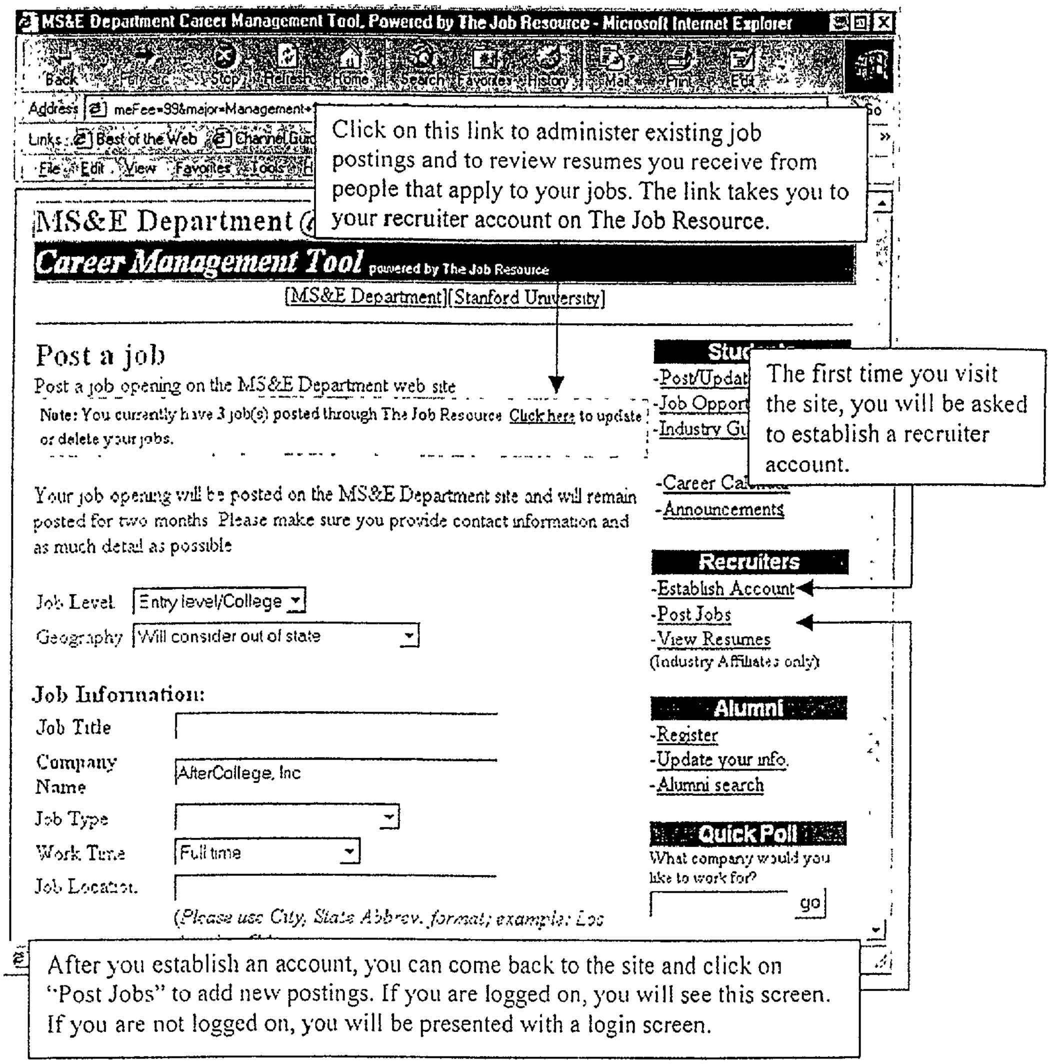
FIGS. 7 and 8 show another website display of the present invention.

FIG. 7 is an example of a screen that the recruiter will view when choosing to post a job or update an existing job. The number of existing jobs for this recruiter will be displayed. If the recruiter wants to update or to delete an existing job he will click on the appropriate spot. This will link the recruiter to the AfterCollege web site that stores the recruiters' account. If the recruiter has not established an account, he will have to branch to a different screen to create an account with a personal login and password.

Figure 8:
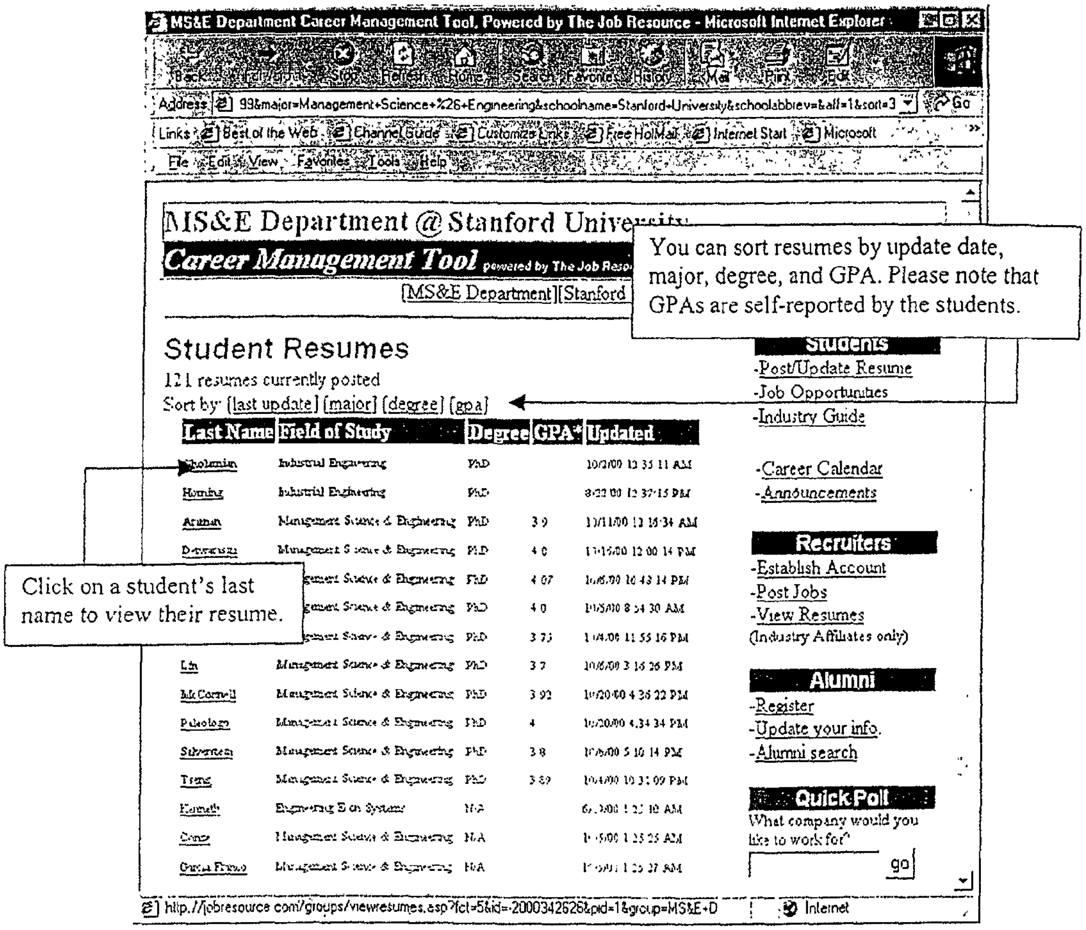

FIG. 8 is an example of a screen that the recruiter will view when choosing to view student resumes. The screen contains a list of student members who have posted resumes on a particular Career Management Tool. A recruiter may sort the resumes by update date, major, degree, and GPA (grade point average which are self-reported by students). A recruiter may then click on a student's last name to view their resume.

Figure 9:
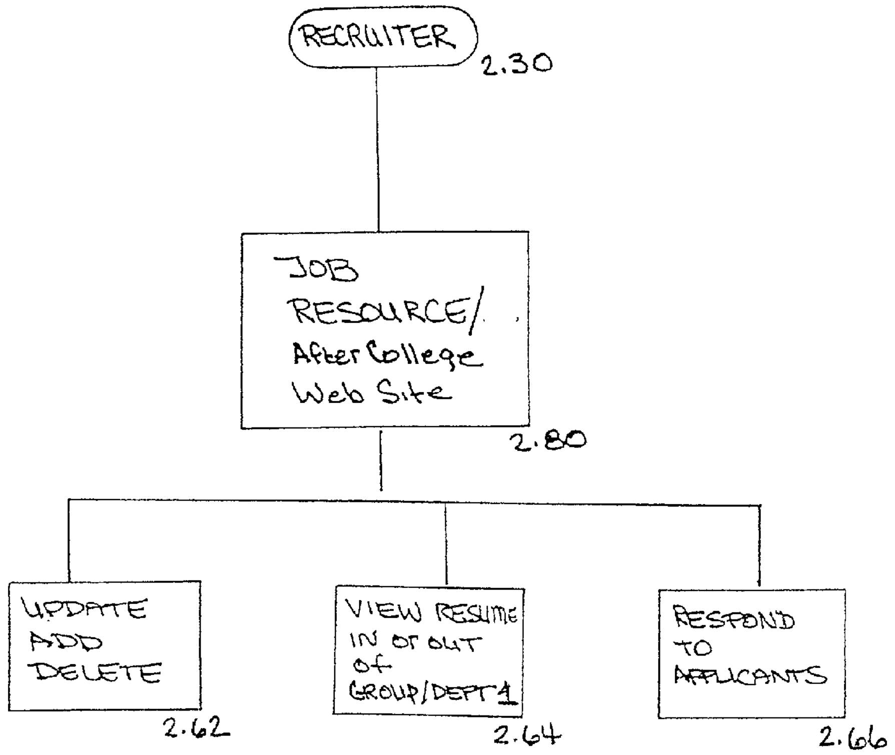
FIG. 9 shows another block diagram of how recruiters can use the career management tool of the present invention.

FIG. 9 shows the various paths an employer or recruiter 2.30 may choose while entering through the AfterCollege web site 2.80. Because the account a recruiter created on the group/dept CMT is also linked to the AfterCollege (AC) web site, the recruiter may log on to the AC web site to update, add or delete job postings, review resumes of people that have applied to jobs, and to also respond to multiple applicants at the same time. Because the recruiter has entered through the AC web site, he/she may receive applicant responses not only from the one group/dept, but also from other groups/departments to which a job has been posted.

Figure 10:
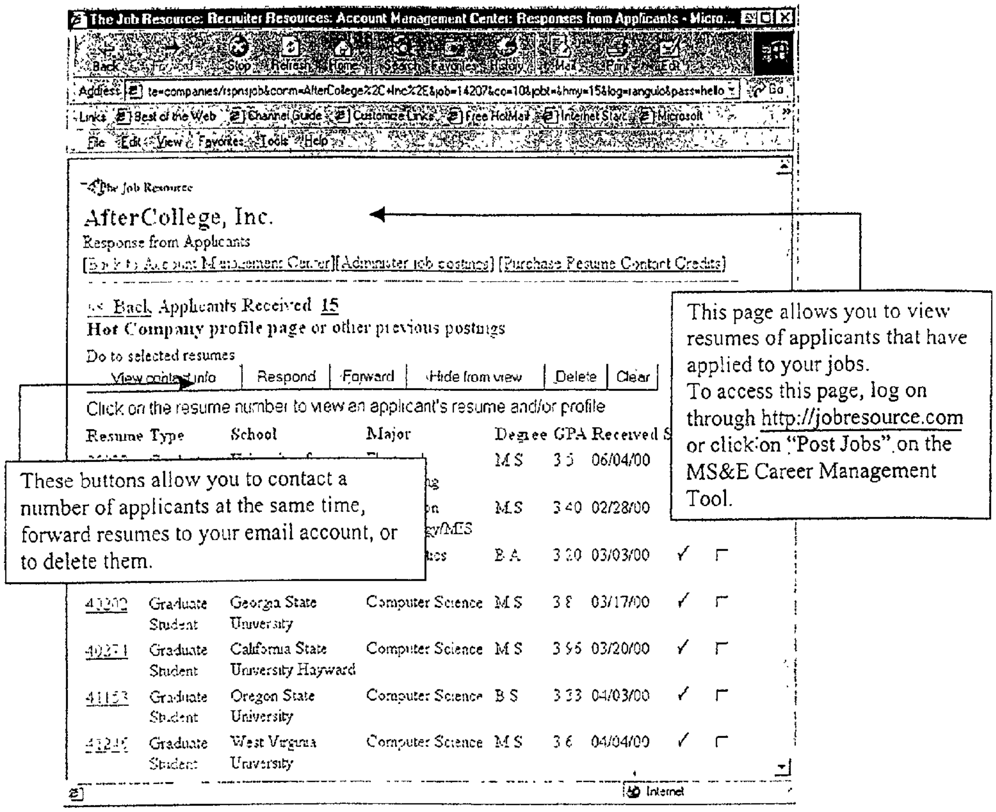
FIG. 10 shows another website display of the present invention.

FIG. 10 is an example of a screen that the recruiter will view when entering the AC web site to see student resumes. There will be a list of candidates by resume number. The recruiter may click on the resume number to view an applicant's resume and/or profile. There are buttons allowing the recruiter to contact a number of applicants at the same time, forward resumes to the recruiters email account or to delete the resumes.

Figure 11:
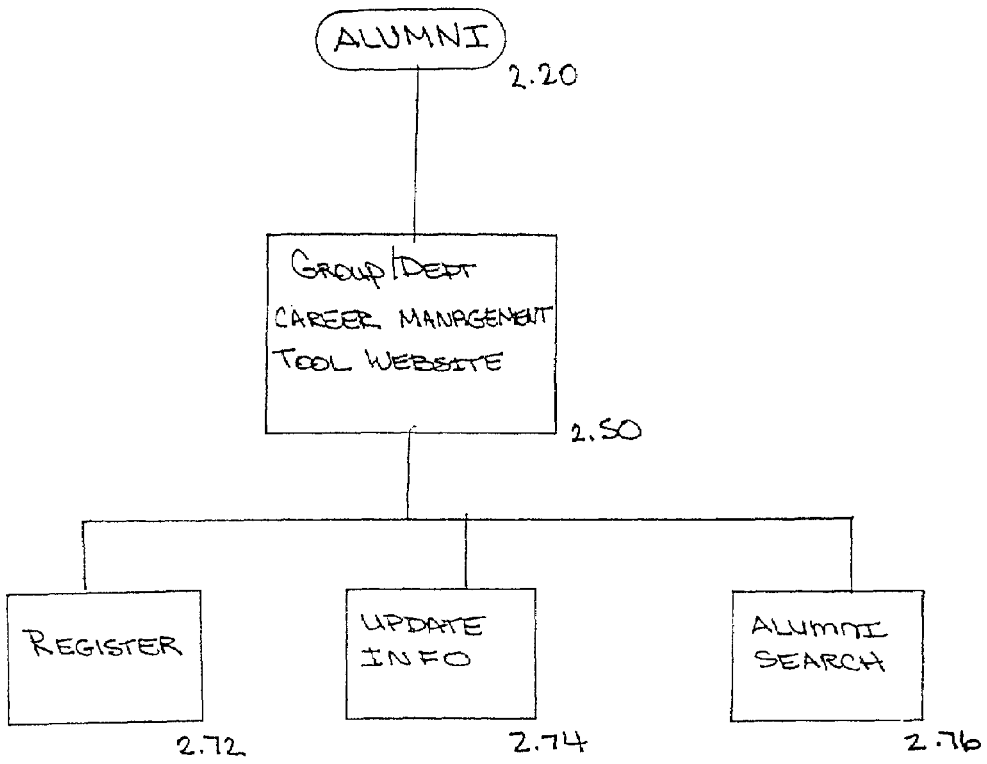
FIG. 11 shows a block diagram of how alumni can use the career management tool of the present invention.

FIG. 11 shows the various paths alumni 2.20 may choose while in the group/dept CMT 2.50. An alum may register 2.72 to be added to the alumni database, post and update information 2.74 to be viewed by the group/dept, or perform an alumni search 2.76. The alumni database may be used by a group or department to keep track of members who have graduated. Registered alumni may serve as contacts for group/dept members looking for employment; they can stay informed about group-specific news and events, and they can keep in touch with other alumni.

Figure 12:
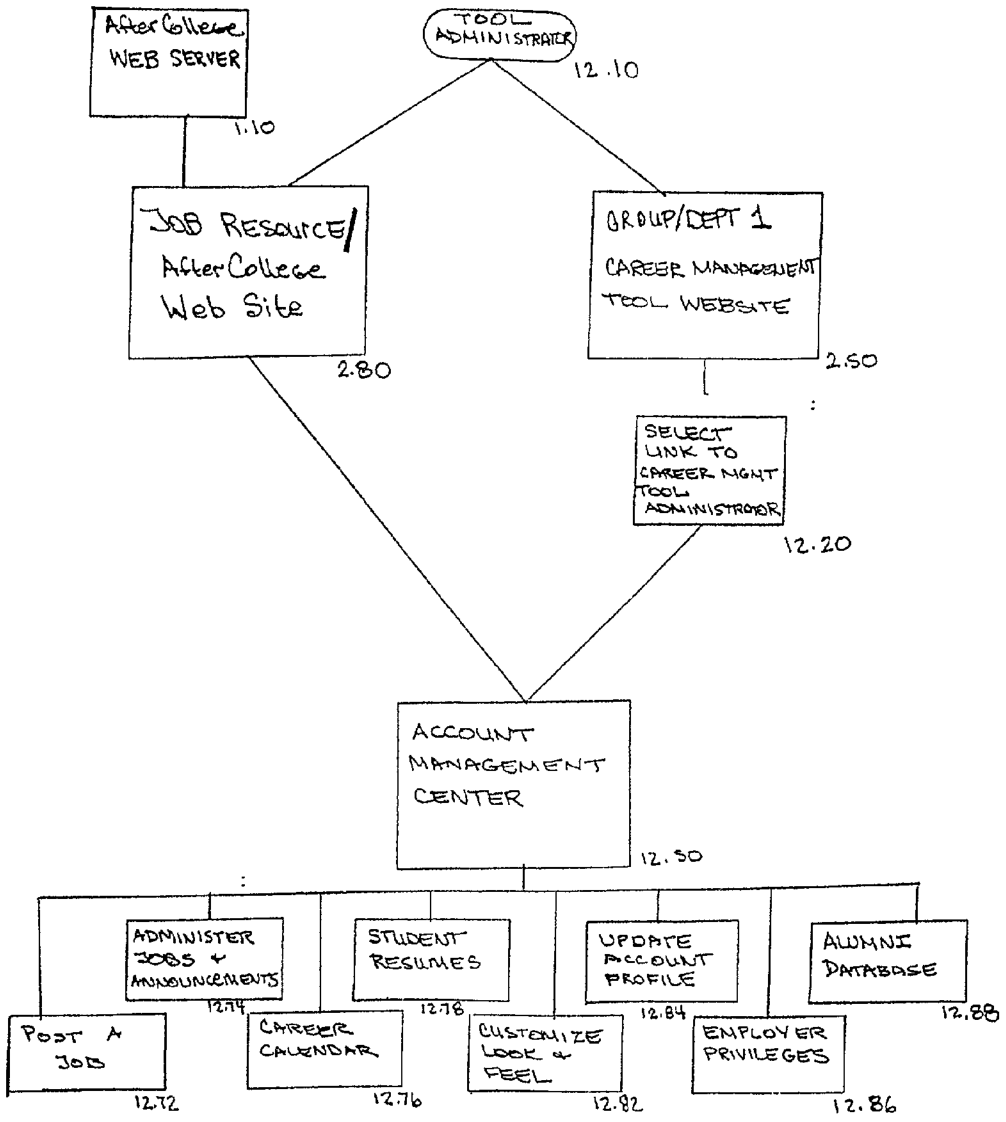
FIG. 12 shows a block diagram of how a group administrator navigates through an account management center for the present invention.

FIG. 12 is an overview of the many paths and functions that the Tool Administrator (administrator) 12.10 may choose in managing and maintaining all aspects of the group/dept CMT web site 2.50. The administrator may enter the Account Management Center 12.50 either through the AC web site 2.80 or through the CMT web site 2.50. The administrator can perform various functions through the CMT, some of which are the following: manually post a job 12.72, administer jobs and announcements 12.74, post new events to the career calendar and delete old ones 12.76, review posted resumes 12.78 deleting unwanted resumes or transfer outdated ones to the alumni directory, alter the CMT's presentation by customizing the look and feel of the CMT web site screens 12.82, update account profiles 12.84, manage employer privileges 12.86, and review the alumni database and export the list to a spreadsheet 12.88.

Figure 13:
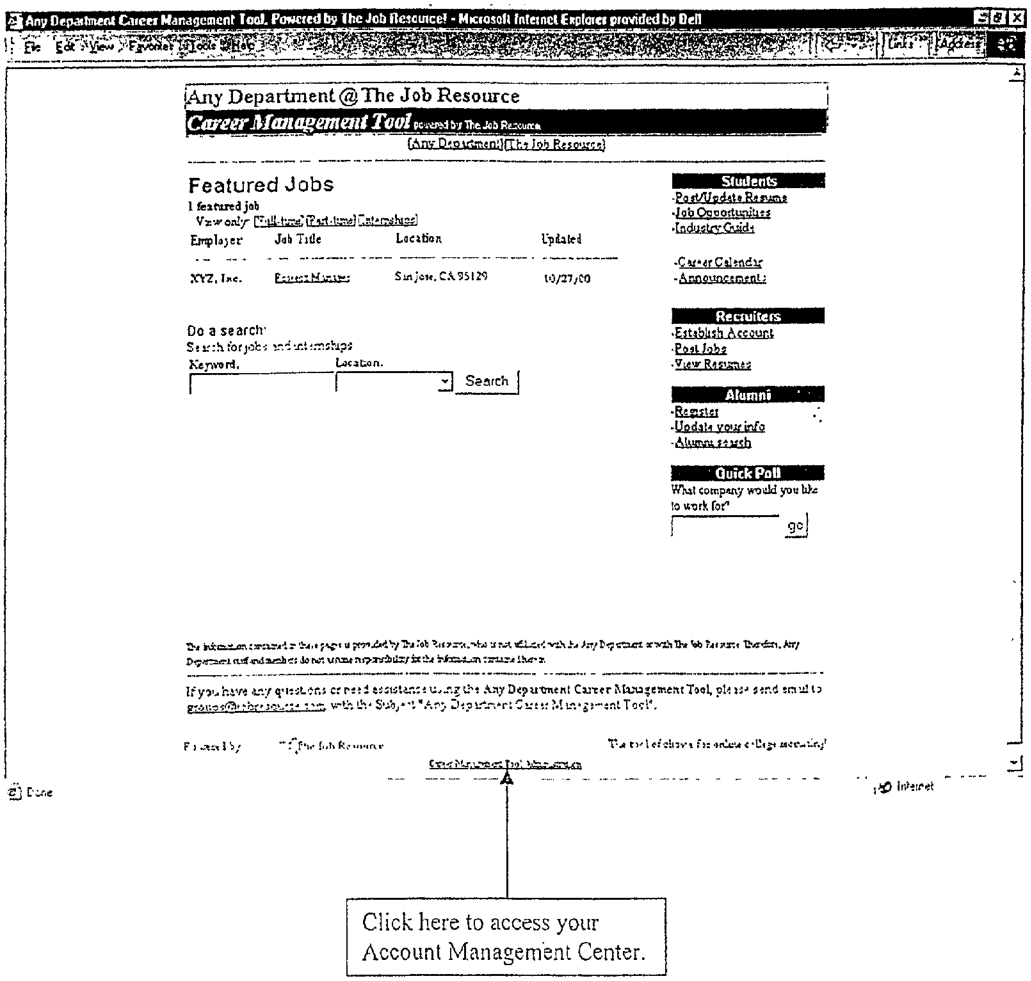
FIGS. 13–24 show still other website displays of the present invention.

FIG. 13 displays a screen on the group/dept CMT web site where the administrator can access the Account Management Center. At the bottom of the screen, the administrator would click on the 'Career Management Tool Administrator' (CMTA) link, which would then link to the Account Management Center log-on page. The administrator can click on this link from any CMT page that contains 'CMTA'. As previously described in FIG. 12, the administrator may also go directly to the AC web site 2.80 to log-on to the Account Management Center.

Figure 14:
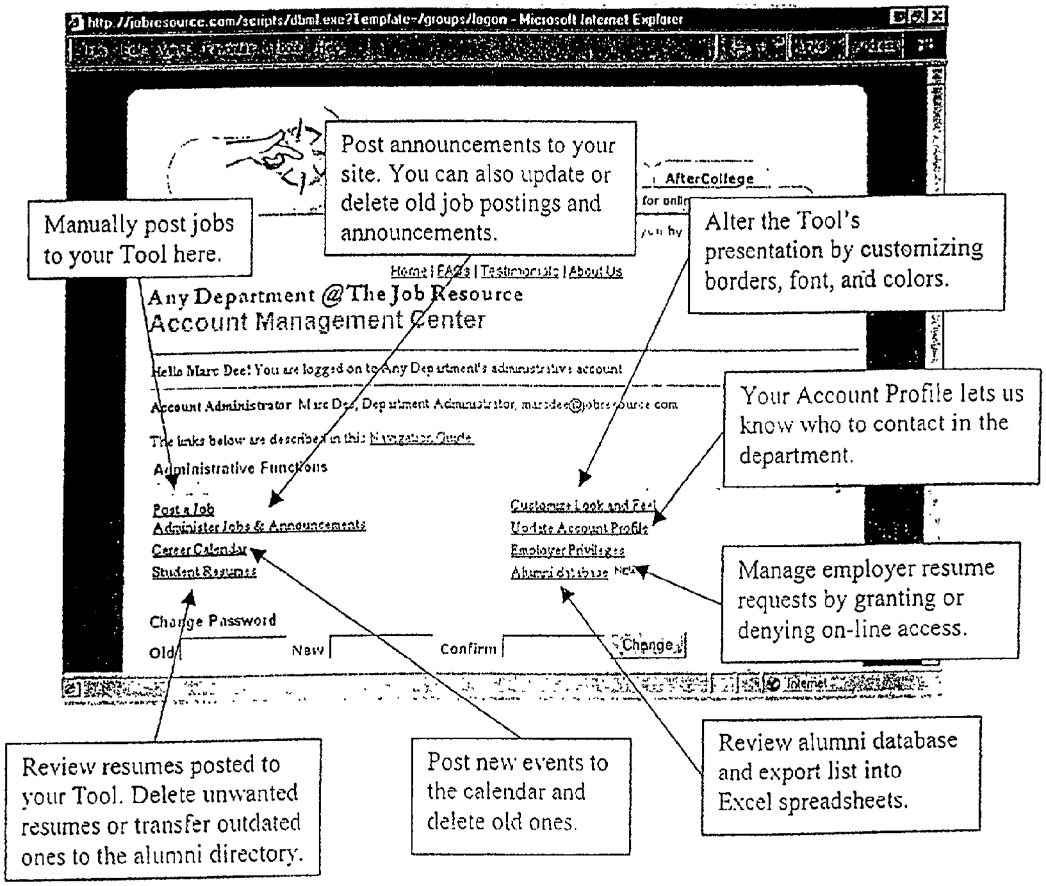

FIG. 14 is an overview of the Account Management Center. Brief descriptions of each of the administrative functions are provided in text boxes. The boxes are: manually post a job 12.72, administer jobs and announcements 12.74, post new events to the career calendar and delete old ones 12.76, review posted student resumes 12.78 deleting unwanted resumes or transfer outdated ones to the alumni directory, alter the CMT's presentation by customizing the look and feel of the CMT web site screens 12.82, update account profiles 12.84, manage employer privileges 12.86, and review the alumni database and export a list to a spreadsheet 12.88.

Figure 15:
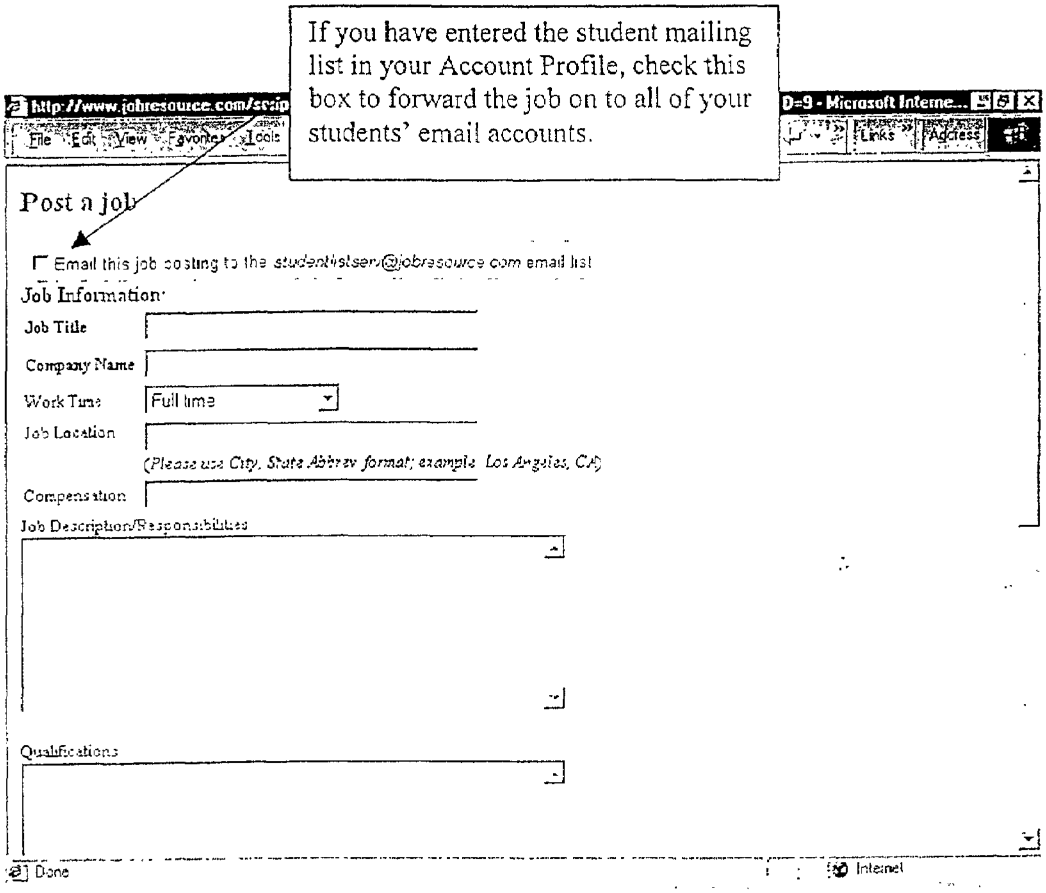

FIG. 15 displays the screen the administrator would view when choosing to 'post a job' 12.72. The administrator may manually enter/post a new job. If the administrator has created a student mailing list in his/her profile, the administrator may check the box indicated, to forward this new job to all of the students on the list. Explanation: Jobs posted on the Career Management Tool may come from 4 different sources:

a. The AfterCollege network of employers using the main AfterCollege web site b. Employers can establish accounts at the group/dept web site and post their jobs directly, or c. Employers often send job postings directly to department administrators. This is the case where the administrator would log onto the Account Management Center and click on 'Post a Job,' the page/screen FIG. 15 would load. The administrator would manually add the job posting to the site by entering information into the relevant fields, or d. Employers posting jobs on one Career Management Tool can forward their jobs from that Career Management Tool to other Career Management Tools.

Figure 16:
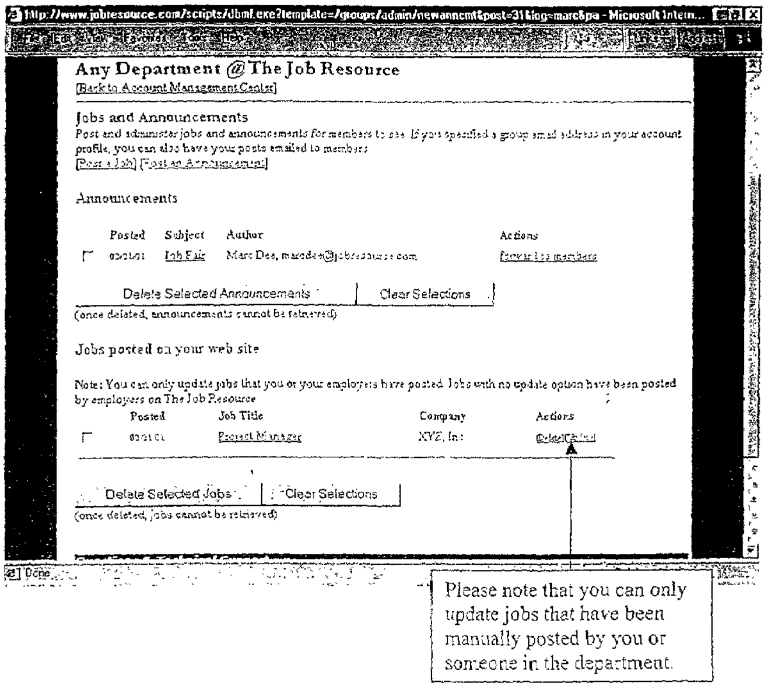

FIG. 16 displays the screen the administrator would view when choosing to 'administer jobs & announcements' 12.74. The administrator may manually add, update and delete jobs that have been manually posted by the administrator or by someone in the department. If the administrator has created a member mailing list in his/her profile, the administrator may forward a new or updated job to the member mailing list. Announcements may also be posted and forwarded to individual members. Old announcements may be deleted through this screen.

Figure 17:
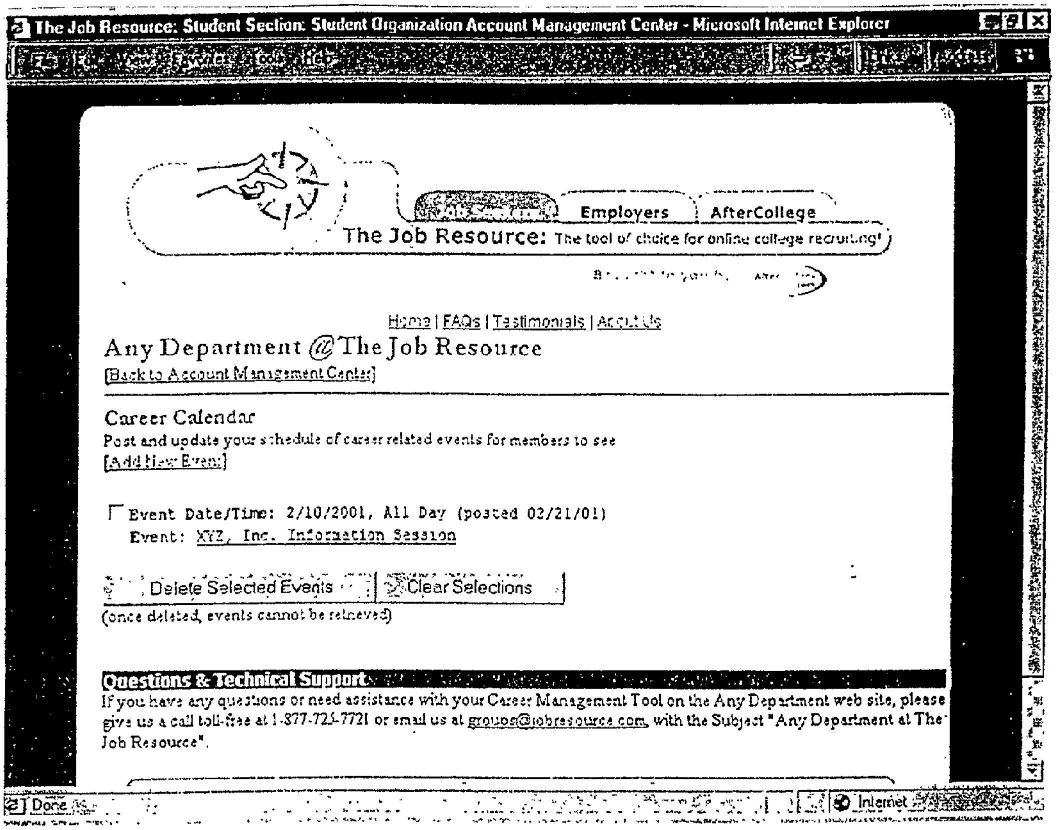

FIG. 17 displays the screen the administrator would view when choosing to 'post events to the Career Calendar' 12.76. The administrator may add, update and delete entries to the schedule of career related events. The Career Calendar exists to help keep students informed of important events.

Figure 18:
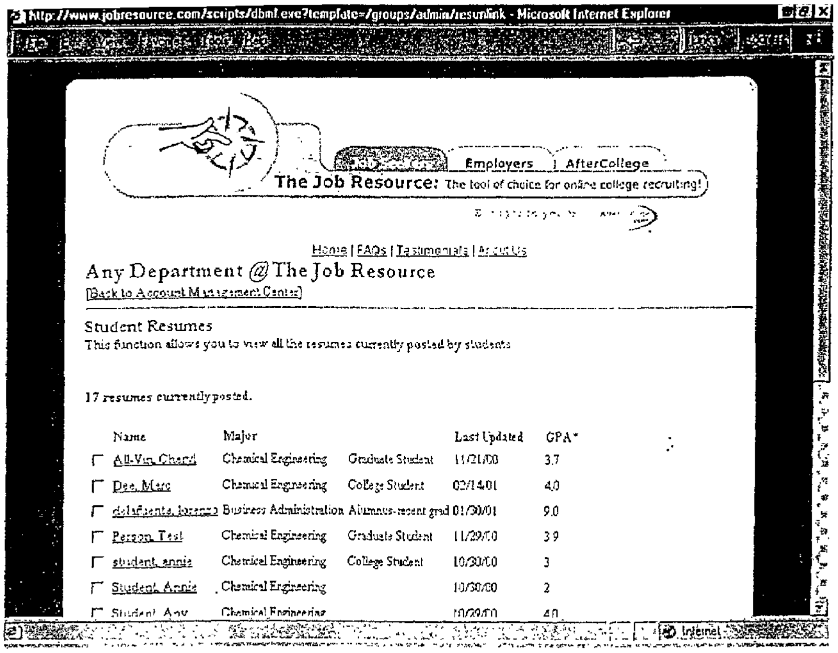
Figure 19:
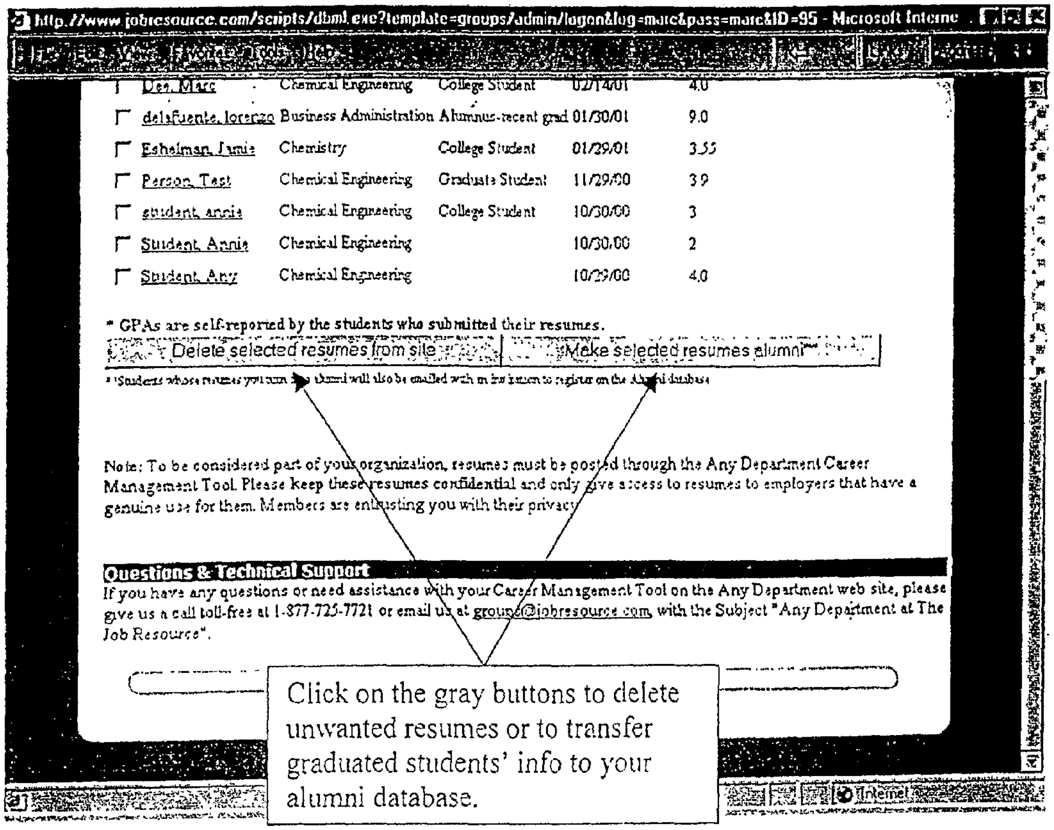

FIG. 18 displays the screen the administrator would view when choosing to 'view all the resumes currently posted by students' 12.78. The screen displays how many resumes are currently posted, followed by an extract about each of the students. The administrator would then select all or some of the resumes to be reviewed. The administrator may delete unwanted resumes or transfer graduated students' information to the alumni database by selecting the buttons on the lower half of the screen depicted in FIG. 19.

Figure 20:
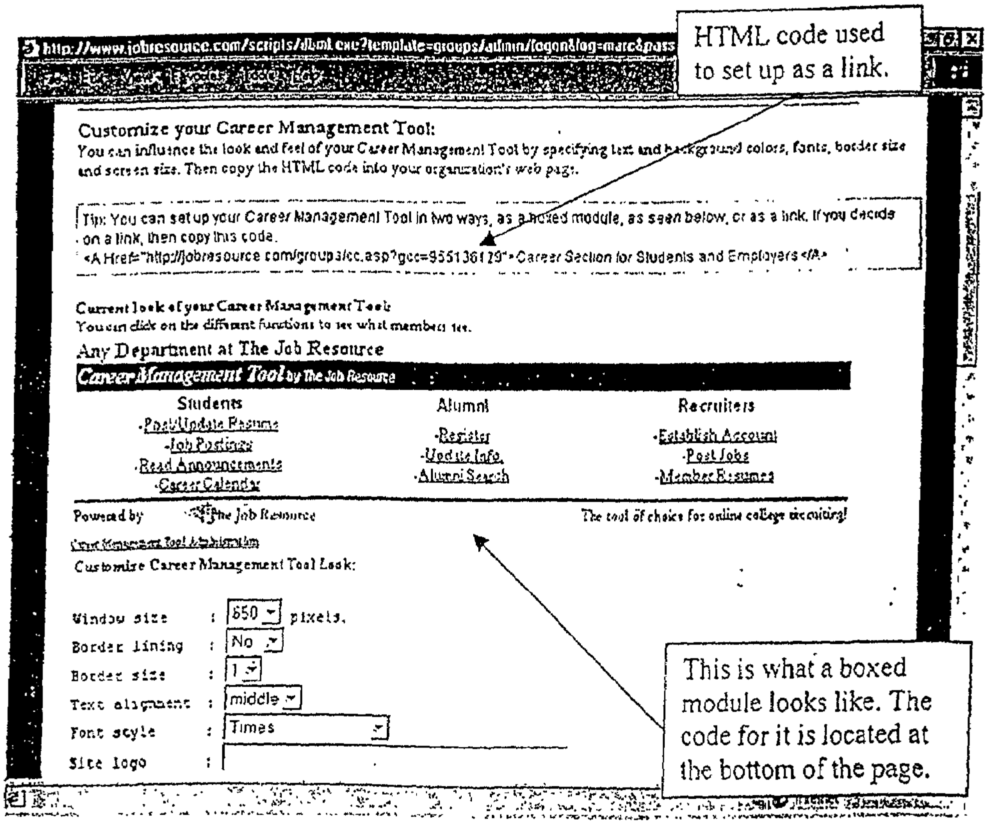
Figure 21:
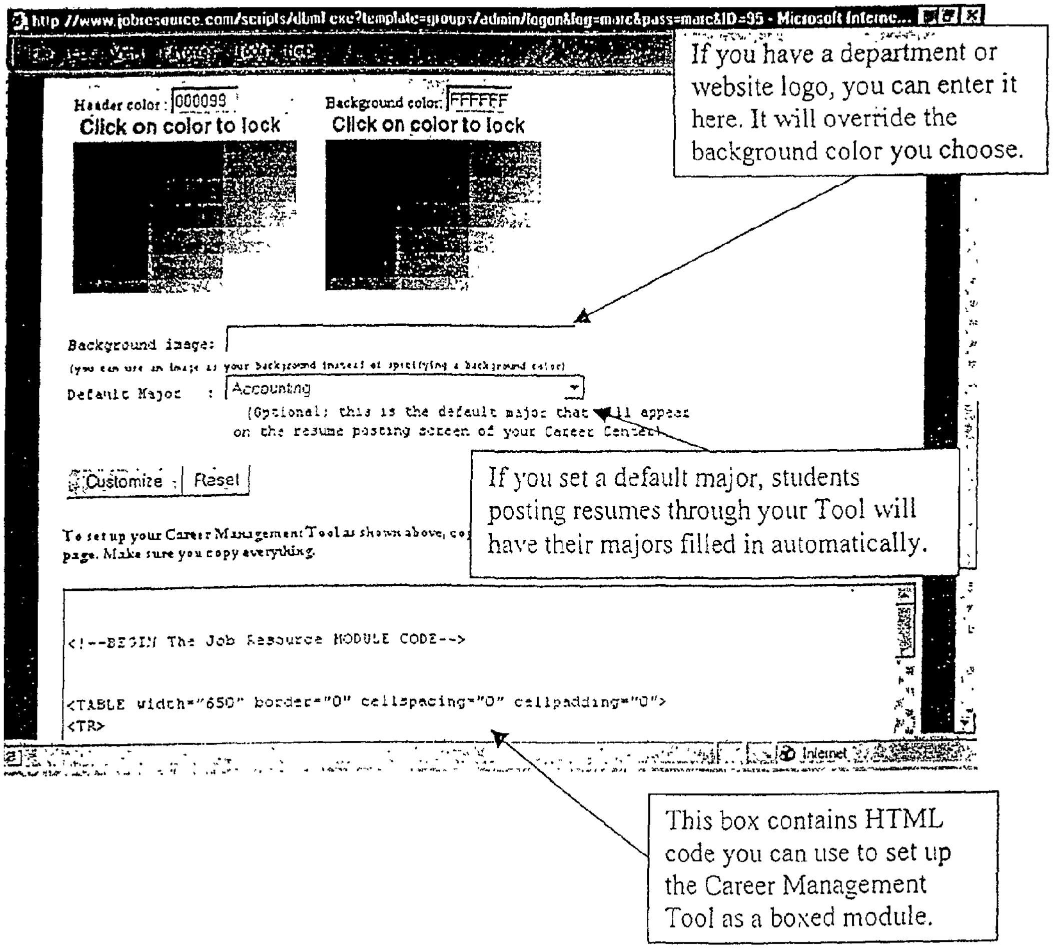

FIGS. 20 and 21 display the top and bottom parts of the screen the administrator would view when choosing to 'customize the look and feel of the group/dept CMT' 12.82. This screen allows the administrator to alter and manipulate the appearance of the group/dept CMT. The administrator can influence the look and feel of the CMT screens by specifying text and background colors, fonts, border size and screen size. The administrator decides how the users will access the group/dept CMT: either as a boxed module displayed in FIG. 20 or as a link.

FIG. 21 is the section of the customizing page/screen that allows the administrator to set the CMT's color scheme. In order, from left to right, the rainbow-colored boxes allow the administrator to specify font, link, header, and background colors. When satisfied with all of the selections, the administrator will click on the 'customize' button. This will generate custom HTML code that the administrator can add to his/her group/dept web site in order to implement a CMT for the group/dept.

Figure 22:
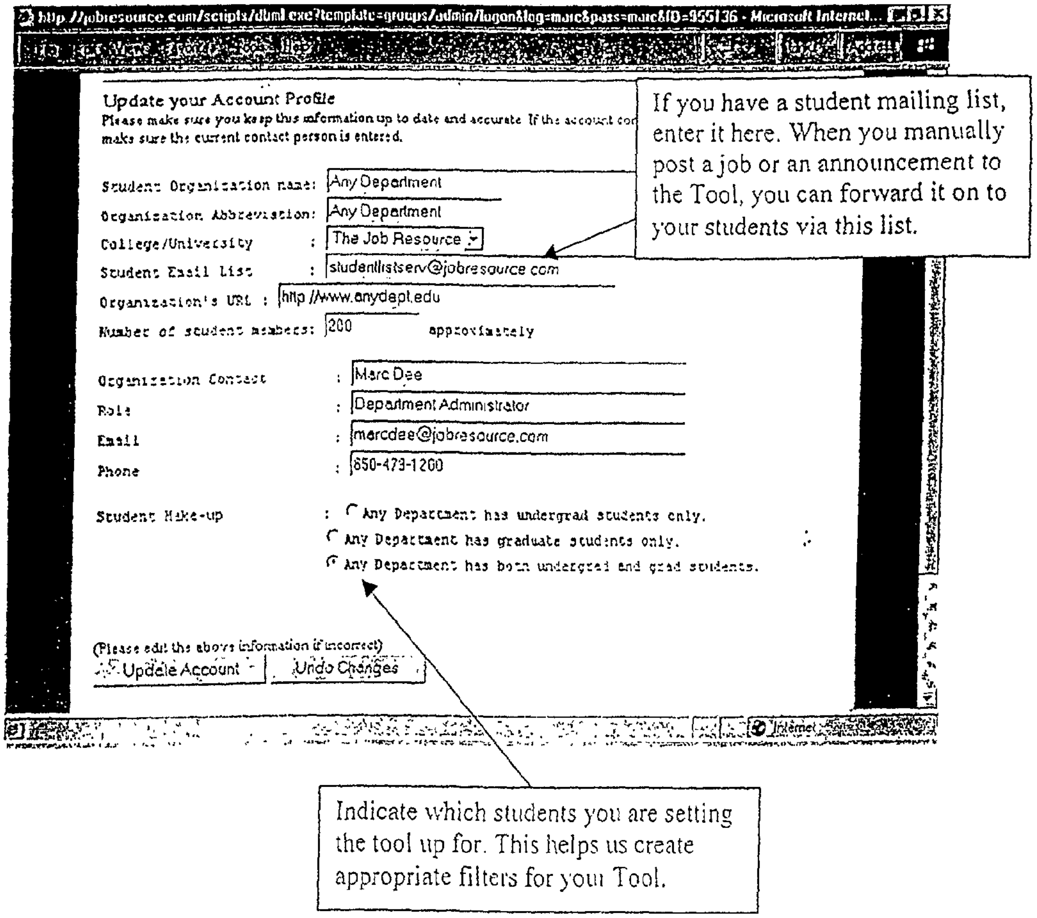

FIG. 22 displays the screen the administrator would view when choosing to 'update the account profile' 12.84. On this screen, the administrator identifies who in the department has access to the Account Management Center and to the CMT's login and password information. The log-on information would be shared with other administrators, but usually one person would be designated as the main contact for site issues. Ideally, the administrator who regularly handles job postings, student services, industry relations and company sponsors would be designated as the main contact. 'Student Email List' is where the administrator enters a member mailing list so that jobs and announcements can be forwarded to all the members on the list. The administrator also designates in the 'Student Make-up' the students for whom he/she is setting up the group/dept CMT: for under graduates only, for graduates students only, or for both undergraduates and graduate students.

Figure 23:
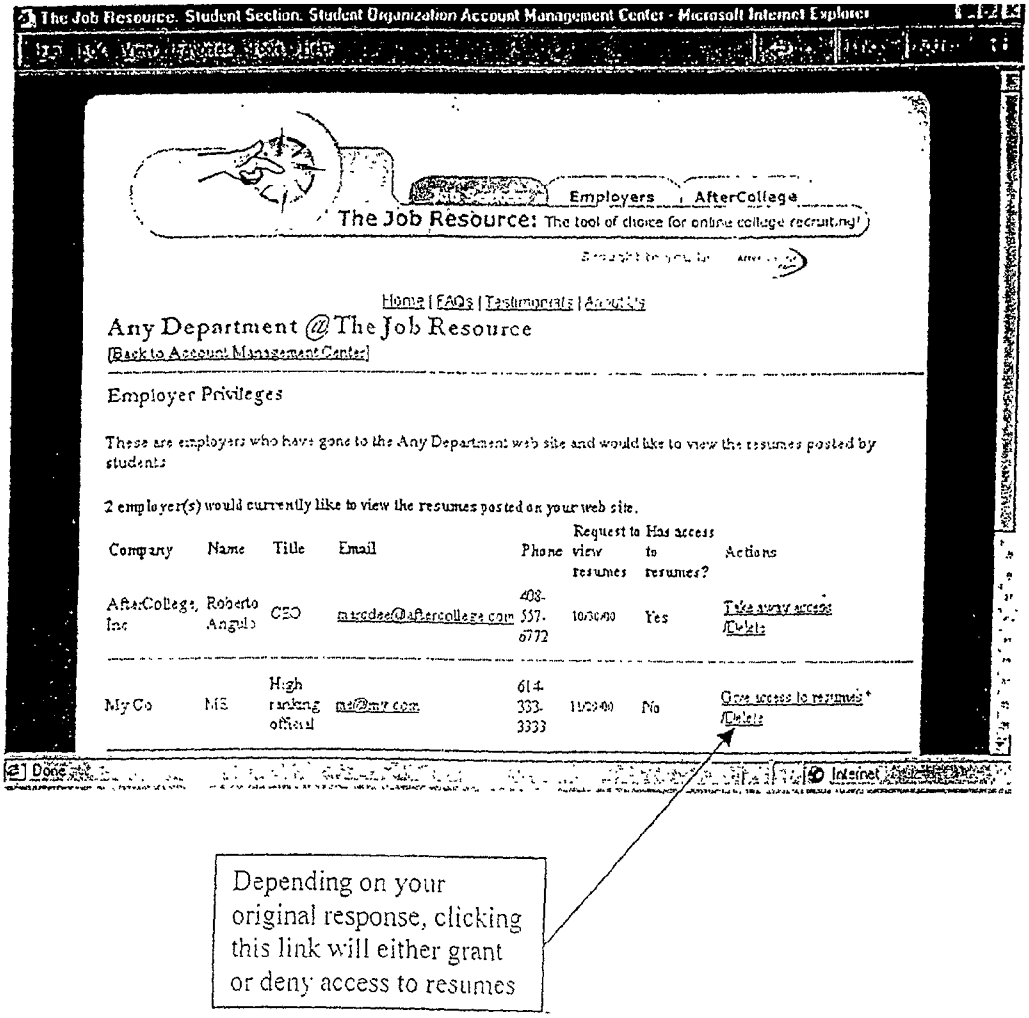

FIG. 23 displays the screen that the administrator would view when choosing 'Employer Privileges' 12.86. Employers may visit the group/dept CMT and request access to the members' resumes on-line. Requests will be received in email form. Links in the email allow the administrator to grant or deny permission, upon receipt. The 'Employer Privileges' link allows the administrator to view a log of employer requests. Here the administrator may grant or deny access, regardless of the administrator's initial response. The administrator may delete requests as necessary, but if the administrator deletes a request from an employer who has been previously given permission to view the resumes, that permission will be revoked. Thereafter, to access resumes, the employer will have to re-submit a request for access.

Figure 24:
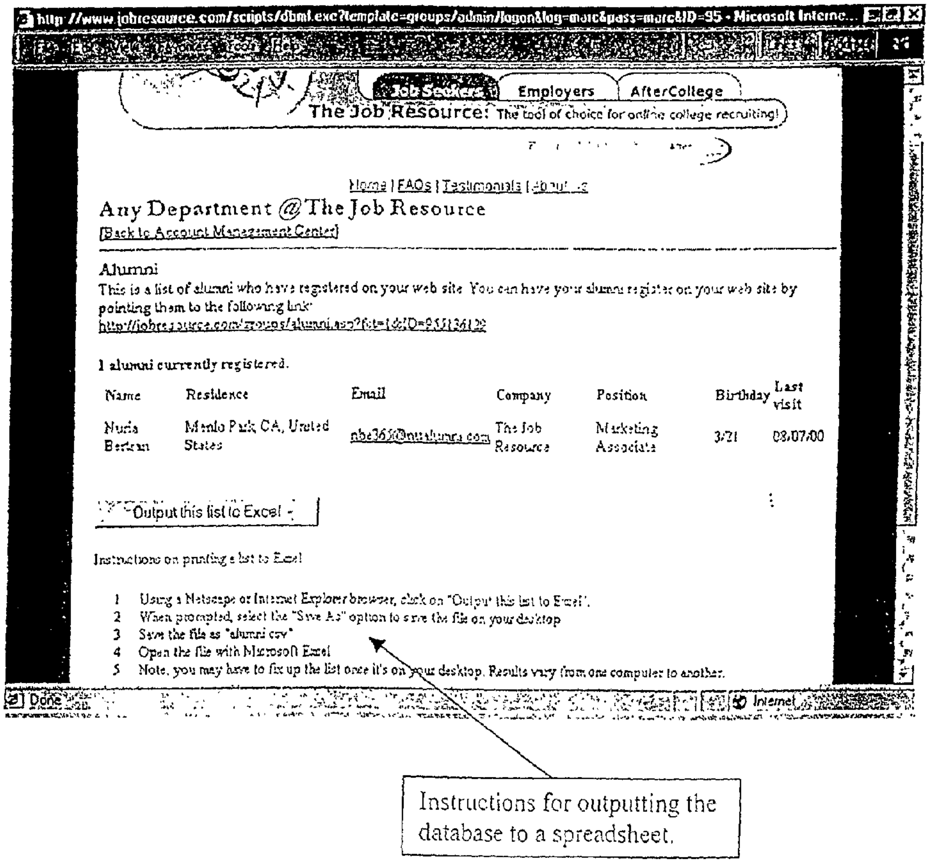

FIG. 24 displays the screen that the administrator views when choosing 'Alumni Database' 12.88. This screen contains the list of alumni who have registered on the group/dept CMT. The data is stored in an Alumni Database. The administrator may view alumni information posted and print it out to a spreadsheet. Instructions are provided on the screen for printing the list to a spreadsheet.

Figure 25:
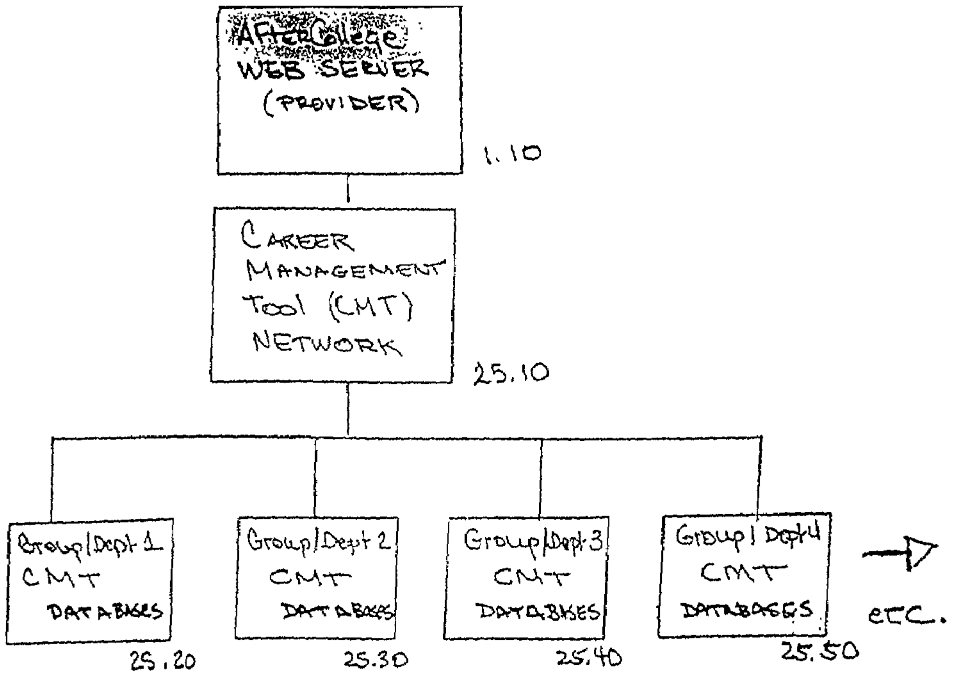
FIG. 25 shows a block diagram of a career management network of the present invention.

FIG. 25 depicts that each of the databases that stores the information for each group/dept's CMT 25.20, 25.30, 25.40, 25.50, and so on, are hosted at a central location/facility 1.10, (a different location than the group's web site 1.50), along with the databases for all other groups. All these databases are maintained and supported by the provider (commonly known as the 'application service provider', in this case, AfterCollege, Inc.). All group and department CMTs create a Career Management Tool Network 25.10, as seen in see FIG. 25. Because of this Network organization, the provider of this facility (AfterCollege, Inc.) is able to easily deliver group specific career-related content to any of the group/dept Career Management Tools in the Network. At the same time, it is able to aggregate information gathered from all CMTs into a central location: the AfterCollege Web Site.

A career management tools and network has been described above. Among the desirable features and advantages of the present invention are the following:

1. The process of creating relationships with multiple academic departments and student groups at colleges and universities in order to provide a service that automates these groups' and departments' career-related activities.

2. The process of utilizing these department and group relationships for the purpose of generating revenue from employers that pay to disseminate information to members of these groups and departments through these relationships.

3. The process of utilizing Career Management Tool infrastructure at department and group web sites for the purpose of generating revenue from employers that pay to disseminate information to members of these groups and departments using this infrastructure.

4. The process of collecting and aggregation of data gathered from all Career management Tools (i.e. from Network) to a central location. Examples of such information include resume and profile data from users that register on the Career Management Tools.

5. A Career Management Tool implementation at departments, groups, fraternities, professional organizations, colleges, programs.

6. Career Management Tool and its functionality.

7. Ability to deliver content to Career Management Tools.

8. Dissemination of data from one Career Management Tool to another one or other ones.

9. Process of implementing link, boxed module, and hosted forms of Career Management Tool.

10. Network concept of linking all Career Management Tools.

11. Sub-Network concept of grouping Career Management Tools into industry-specific, ethnicity-specific, geography-specific, school-specific, or field-of-study-specific sub-communities of Career Management Tools.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. For example, the preferred embodiment uses a University Department as the targeted group for recruitment for purposes of illustrating this invention. However, any other specific group or organization could be the object of recruitment for utilizing this invention as well. Also, this invention on the Internet could be used for an employer to simulate having a job fair booth plus a many other activities, known as a 'Virtual Booth', which is a media-rich online presence containing video, jobs, and local information, to target individuals at specific departments and/or groups. This Booth could have the corporate logo, link to the corporate web site and have a company description. These are just a few of the numerous options that could be contained in this 'Virtual Booth'. Another exciting feature of this invention on the Internet is the ability to provide an employer with a completely interactive remote recruiting service, known as a 'Virtual InfoSession'. In real-time an employer could perform a single "Virtual InfoSession" reaching multiple groups in remote geographical locations simultaneously for the purpose of recruiting. The embodiments were chosen and described in order to best explain the principles of the invention and its practical application, to thereby enable others skilled in the art to best utilize the invention and various embodiments with various modifications as are suited to the particular use contemplated. It is intended that the scope of the present invention be defined by the Claims appended hereto and their equivalents.

What is claimed is:

1. A method of targeting qualified candidates comprising:

identifying a first group of associated candidates on a computer accessible via the internet said first group of associated candidates sharing a first common qualification;

further identifying at least one additional candidate qualification associated with each said first group of candidates;

identifying a second group of associated candidates on a computer accessible via the internet said associated candidates sharing a second common qualification wherein said second common qualification is different from said first common qualification;

further identifying at least one additional candidate qualification associated with each of said second group of candidates;

establishing a first database of available opportunities on a computer accessible via the internet;

associating at least two desired qualifications for each of said opportunities in said first database;

establishing a second database of said first group of associated candidates, their first common qualification and their additional candidate qualifications;

establishing a third database of said second group of associated candidates, their second common qualification and their additional candidate qualifications;

comparing said first and said second common qualifications and said additional candidate qualifications contained in said second and third databases with said at least two desired qualifications contained in said first database to produce comparison results; and using said comparison results to provide information concerning individual candidates from said first and said second group of associated candidates to a provider of said available opportunities.

2. The method of claim 1 wherein said first common qualification is an affiliation of said first group of associated candidates to a first college, university, community college, school, professional association, or other educational facility.

3. The method of claim 2 wherein said second common qualification is an affiliation of said second group of associated candidates to a second college, university, community college, school, professional association, or other educational facility.

4. The method of claim 1 wherein said at least one additional candidate qualification is selected from the group consisting of a grade point average within a range of grade point averages, an associated major, membership in an academic department, membership in an academic student group, membership in an honor society, membership in a fraternity chapter, membership in a professional group chapter, and ethnicity-focused groups.

5. The method of claim 1 wherein said available opportunity is selected from the group consisting of employment opportunities, research position opportunities, teaching position opportunities, and educational opportunities.

6. The method of claim 1 wherein said second database includes information on non-candidate individuals who share the first common qualification with said associated candidates.

7. The method of claim 6 wherein said first common qualification is association with an educational facility and said non-candidate individuals are one of an alumni and a faculty member of said educational facility.

8. The method of claim 1 wherein said second database also includes information pertaining to at least one of group specific news and events, job fairs, and bulletin boards associated with said first common qualification.

9. The method of claim 1 wherein said first data base, said second data base and said third data base are incorporated into a career management network tool.

10. The method of claim 9 wherein a front end of said career management network tool is hosted on a server of an educational facility or a server of a professional organization.

11. The method of claim 10 wherein a display of said front end of said career management network tool is capable of being customized for incorporation into web pages associated with said educational facility or said professional organization.

12. The method of claim 1 wherein a back end of said career management network tool is hosted on a server of a service provider.

13. The method of claim 12 wherein said back end is accessed via a hyperlink on a web site of an educational facility.

14. The method of claim 1 wherein said first database, said second data base and said third databases are hosted on a server of a service provider.

15. The method of claim 1 wherein said opportunities are employment opportunities and said employment opportunities are associated with potential employers where said potential employers pay a fee for inclusion of their employment opportunities in said first database.

16. The method of claim 15 wherein said employment opportunities entered by said potential employers include at least two desired qualifications and said desired qualifications are compared to one of said first and said second common qualifications and said additional candidate qualifications.

17. The method of claim 1 further comprising:

including scholarship information and at least one scholarship qualification in said second database, comparing one of said candidate qualifications with said at least one scholarship qualification; and using results of said comparison to provide scholarship information to one or more candidates possessing said at least one candidate qualification.

18. The method of claim 1 further comprising:

including financial aid information and at least one financial aid qualification in said second database, comparing said at least one candidate qualification with said at least one financial aid qualification; and using results of said comparison to provide said financial aid information to one or more candidates possessing said at least one candidate qualification.

19. A method of targeting opportunities comprising:

identifying a first group of associated candidates on a computer accessible via the internet, said first group of associated candidates sharing a first common qualification;

further identifying at least one additional candidate qualification associated with each of said first group of candidates;

identifying a second group of associated candidates on a computer accessible via the internet said associated candidates sharing a second common qualification wherein said second common qualification is different from said first common qualification;

further identifying at least one additional candidate qualification associated with each of said second group of candidates;

establishing a first database of available opportunities on a computer accessible via the internet;

associating at least two desired qualifications for each of said opportunities in said first database;

comparing one of said first and said second common qualifications and said additional candidate qualifications with said at least two desired qualifications contained in said first database to produce comparison results; and using said comparison results to provide information concerning at least one of said opportunities from said first database to at least one individual candidate from said first and said second group.

20. A career management network used for matching qualified candidates for employment with potential employers, said network comprising:

a career management network tool affiliated with a first educational facility including a first database of candidates on a computer accessible via the internet, said candidates each being associated with said first educational facility wherein said first database includes additional candidate qualifications for each of said candidates;

a career management network tool affiliated with a second educational facility including a second database of candidates on a computer accessible via the internet, said candidates each being associated with said second educational facility wherein said second educational facility is different from said first educational facility wherein said second database includes additional candidate qualifications for each of said candidates;

a career management network provider including a third database of available positions on a computer accessible via the internet, wherein said third database includes desired qualifications for each of said positions in said third database;

a comparator for comparing said desired qualifications contained in said third database with said candidate qualifications contained in said first and second databases; and using results of said comparator to provide information concerning positions associated with said desired qualifications to the candidates possessing said desired qualifications.

21. The method of claim 20 wherein a front end of said career management tool is hosted on a server of an educational facility.

22. The method of claim 21 wherein a display of said front end of said career management network tool is capable of being customized from incorporation into web pages associated with said educational facility.

23. The method of claim 22 wherein a back end of said career management tool is hosted on a sever of a service provider.

24. The method of claim 23 wherein said back end is accessed via a hyperlink on a web site of an educational facility.

25. A career management network used for matching qualified candidates for employment with potential employers, said network comprising:

a career management network tool affiliated with a first educational facility including a first database of candidates on a computer accessible via the internet, said candidates each being associated with said first educational facility wherein said first database includes additional candidate qualifications for each of said candidates;

a career management network tool affiliated with a second educational facility including a second database of candidates on a computer accessible via the internet, said candidates each being associated with said second educational facility wherein said second educational facility is different from said first educational facility wherein said second database includes additional candidate qualifications for each of said candidates;

a career management network provider including a third database of available positions on a computer accessible via the internet, wherein said third database includes desired qualifications for each of said positions in said third database;

a comparator for comparing said desired qualifications contained in said third database with said candidate qualifications contained in said first and second databases; and using results of said comparator to provide information concerning candidates associated with said desired qualifications to the providers of said opportunities.

* * * * *